United States Patent [19]

Okamoto

[11] 4,304,884
[45] Dec. 8, 1981

[54] CHLORINATED PVC BLENDS WITH IMPROVED PROCESSABILITY

[75] Inventor: Yoshihisa Okamoto, Sagamore Hills, Ohio

[73] Assignee: The B. F. Goodrich Company, Akron, Ohio

[21] Appl. No.: 103,816

[22] Filed: Dec. 14, 1979

[51] Int. Cl.$^3$ .............................................. C08L 27/24
[52] U.S. Cl. .................................. 525/230; 525/192; 525/238; 525/239
[58] Field of Search ................ 525/192, 230, 238, 239

[56] References Cited

U.S. PATENT DOCUMENTS

| | | | |
|---|---|---|---|
| 2,988,530 | 6/1961 | Slocombe et al. | 525/238 |
| 3,268,626 | 8/1966 | Jennings et al. | 525/234 |
| 3,678,132 | 7/1972 | Isogawa et al. | 525/230 |

FOREIGN PATENT DOCUMENTS 710379  5/1965  Canada ............................... 525/238

*Primary Examiner*—Carman J. Seccuro
*Attorney, Agent, or Firm*—George A. Kap; J. Hughes Powell, Jr.

[57] ABSTRACT

Preferred blends with improved processability of CPVC resin and polymers of alpha methylstyrene, styrene or methyl methacrylate, and acrylonitrile, said polymers 5 having dilute solution viscosity of less than 2.

10 Claims, 1 Drawing Figure

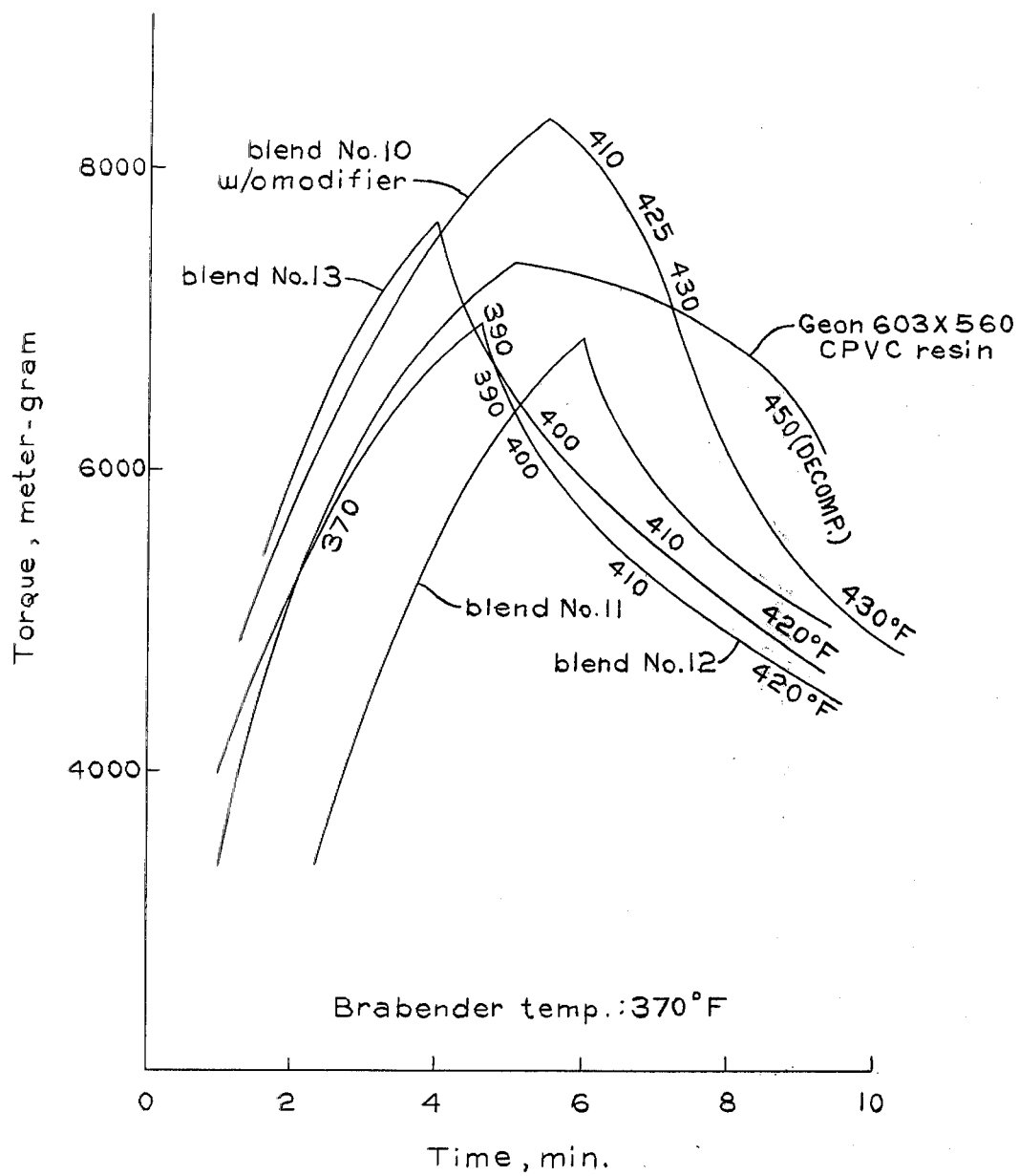

CHLORINATED PVC BLENDS WITH IMPROVED PROCESSABILITY

BACKGROUND OF THE INVENTION

Chlorinated polyvinyl chloride (CPVC) is a rigid thermoplastic material that was introduced in 1960 for water distribution piping that can operate at 100 psi and 180° F. These conditions are safely above typical temperatures and pressures of domestic water heaters. Because CPVC retains physical properties at temperatures well above other thermoplastics, it has been specified for a variety of other extruded and custom-molded products. In view of its inertness in the presence of many corrosive fluids, CPVC has been used widely in electroplating, metal finishing, in other corrosive fluid systems, in pipe and fittings, in pumps, tanks and other products.

The post-chlorinated polyvinyl chloride resins can be processed and formed by conventional techniques such as milling, calendering, extruding, laminating, compression molding, and transfer molding. One major disadvantage that is experienced with CPVC resins is their poor processability. This is exemplified by milling CPVC on a roll mill which results in high torque and high temperatures accompanied by its decomposition. Softening additives or plasticizers have been added to CPVC in order to improve its processability, however, although its processability is thus improved, these additives produce undesirable effects. Some of the more significant detrimental effects produced by inclusion of the additives are heat sensitivity, softness and weakness in terms of lower tensile strength and less desirable chemical and electrical properties than exhibited by CPVC alone. These negative attributes of the additives on CPVC limit usefulness of the modified CPVC in the manufacture of rigid plastic articles.

Poor processability of CPVC has been recognized and attempts have been made to ameliorate this problem. U.S. Pat. No. 3,268,626 to Jennings describes a thermoplastic composition which has substantially the same properties as CPVC resin but which also possesses improved processability and shock resistance. This composition comprises CPVC resin containing small amounts of two copolymers, i.e., a first copolymer of styrene and acrylonitrile containing 20 to 35% by weight of polymerized acrylonitrile units having a dilute solution viscosity of 0.3 to 0.7; and a second rubbery, cross-linked copolymer of butadiene and acrylonitrile containing 20 to 30% by weight of polymerized acrylonitrile units. On the basis of 100 parts by weight of CPVC, amount of styrene-acrylonitrile copolymer can vary from 1 to 15 parts by weight and amount of butadiene-acrylonitrile copolymer can vary from 3 to 15 parts by weight.

U.S. Pat. No. 3,678,132 to Isogawa discloses thermoplastic compositions which have the combination of good molding property, high impact resistance and high heat resistance. The composition is prepared by blending polyvinyl chloride with a terpolymer and a graft copolymer. The terpolymer is prepared by copolymerizing 30 to 80% by weight alpha methylstyrene, 5 to 50% methyl methacrylate, and 3 to 30% acrylonitrile whereas the graft copolymer is prepared by graft copolymerizing onto 15 to 35% of a butadiene polymer, 35 to 65% of a monomer mixture of 50 to 80% styrene, 20 to 50% methyl methacrylate, and 0 to 30% acrylonitrile. Relative proportion of components is 20 to 60% PVC resin, and 80 to 40 of the terpolymer and the graft copolymer. As between the latter two, relative proportion is 40 to 80% of the terpolymer to 60 to 20% of the graft copolymer.

Since PVC processes easily and CPVC does not, and since CPVC has high heat resistance but PVC does not, it should be apparent that CPVC and PVC are different materials and that PVC prior art is not analogous to the patentability issues relating to CPVC.

SUMMARY OF THE INVENTION

This invention relates to a composition of matter which, in a preferred embodiment, is a blend of a CPVC resin and a polymer of alpha methylstyrene, styrene or methyl methacrylate, and acrylonitrile. The polymer has a dilute solution viscosity (DSV) in methyl ethyl ketone of less than 2. This composition has improved processability, tensile strength, heat distortion temperature, and exhibits other properties which remain essentially unimpared, when compared to the properties of straight CPVC.

In a more general sense, this invention relates to composition of matter comprising a mixture of a chlorinated polyvinyl chloride and a polymer which is present in at least a sufficient amount to improve processability of the composition without substantially adversely affecting other properties, said polymer has a dilute solution viscosity of less than about 2, and is prepared by polymerizing 40 to 80 parts of alpha alkylstyrene, 20 to 50 parts of a vinyl compound selected from vinyl benzenes and acrylates, and 2 to 50 parts of an aliphatic nitrile.

REFERENCE TO THE DRAWING

The attached drawing represents tests that were performed on CPVC resins alone and blends thereof with unmodified and modified terpolymers with molecular weight modifiers. These tests were performed on a Brabender milling apparatus to evaluate processability of CPVC resins and blends thereof with the terpolymers pursuant to the invention defined herein.

DETAILED DESCRIPTION OF THE INVENTION

The invention described herein relates to a thermoplastic composition which is a blend of unplasticized CPVC resin and a terpolymer of a ring substituted or unsubstituted alkylstyrene, ring substituted or unsubstituted vinyl benzene or an alkyl acrylate, and a nitrile. Dilute solution viscosity (DSV) in methyl ethyl ketone of suitable terpolymers is less than 2, preferably 0.1 to 1.5, and more preferably 0.5 to 1. Amount of the terpolymers blended with the CPVC resin can vary from a minimum amount sufficient to improve processability of the resulting blend without adversely affecting other properties thereof, to a maximum amount which does not adversely affect the improved processability nor substantially adversely affect the other properties.

Blends of CPVC with the terpolymers are yellowish, transparent, and have only one glass transition temperature. Such CPVC blends have improved heat deflection temperature, tensile strength, as well as processability.

As is well known, one major drawback of CPVC resins is their poor processability. Since it is known that polystyrene and low molecular weight poly alpha methylstyrene are often used as processing aids for plastics, attemps were made to blend these processing aids and copolymers thereof with other monomers in order to improve processability of CPVC without adversely affecting other properties thereof. When CPVC was first blended with a terpolymer of alpha methylstyrene, styrene and acrylonitrile, processability of such blends was as poor as that of CPVC alone. After evaluating results of these blends, it was decided to try lower molecular weight terpolymers. The use of the terpolymers of lower molecular weight falling within the herein defined DSV ranges, produced the desired results.

Relative proportion of CPVC to the terpolymer can vary from about 30 to 98 parts by weight of CPVC to about 70 to 2 parts by weight of the terpolymer, preferably from 60 to 90 parts CPVC to 40 to 10 parts of the terpolymer. As is apparent from the ranges given herein, the blends can tolerate a large proportion of the terpolymer. Since the terpolymers have good processability but are brittle, proportion thereof in the CPVC blends should be judged by the degree of brittleness that can be tolerated in the final product.

Composition of the terpolymer itself can vary considerably. Relative amount of alpha alkylstyrene can vary from about 40 to 80 parts by weight, preferably 45 to 75 parts; amount of vinyl benzene can vary from about 2 to 50 parts by weight, preferably 5 to 40 parts; and amount of the nitrile can vary from about 2 to 50 parts by weight, preferably from about 5 to 40 parts. Acrylates can be used in place of all or part of the vinyl benzene in amounts specified for the vinyl benzene.

The post-chlorinated polyvinyl chloride (CPVC) resin used in the compositions of this invention has a density within the range of approximately 1.53 to 1.59 gms/cc at 25° C., a chlorine content of from about 60 to 75% by weight, and a heat distortion temperature of from about 95° C. to 125° C., that is, at least about 20° C. higher than the heat distortion temperatures of unchlorinated polyvinyl chloride resins. Heat distortion temperature was measured by the ASTM test method D648.

The preferred post-chlorinated polyvinyl chloride resins have densities in the range of from about 1.55 to about 1.58 gms/cc at 25° C., a chlorine content within the range of about 65 to 72% by weight and heat distortion temperature of at least 100° C. Said post-chlorinated polyvinyl chloride resins are not degraded in the unmodified condition when heated in the air for at least 10 minutes at 375° F. to 400° F. The CPVC resins are substantially insoluble in acetone but are soluble in tetrahydrofuran. U.S. Pat. Nos. 2,996,489 and 3,100,762 describe these post-chlorinated polyvinyl chloride resins in considerable detail and give methods for their preparation.

The alpha alkylstyrene monomer is selected from compounds having the formula

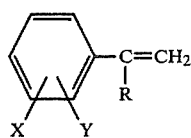

where X and Y can be the same or different and are selected from hydrogen, halogens and alkyl radicals containing from 1 to 3 carbon atoms, preferably X and Y are selected from hydrogen, chlorine, and alkyl radicals of 1 to 3 carbon atoms; and R is selected from alkyl radicals containing from 1 to 8 carbon atoms, preferably 1 to 4 carbon atoms. Specific examples of alpha alkylstyrene include alpha methylstyrene, p-methyl-alpha methylstyrene, 2,4-dimethyl-alpha methylstyrene, 2,5-dimethyl-alpha methylstyrene, 2,5,6-trimethyl-alpha methylstyrene, p-t-butyl-alpha methylstyrene, p-chloroalpha methylstyrene, 2,5-dichloro-alpha methylstyrene, 2,5-difluoro-alpha methylstyrene, alpha ethylstyrene, alpha propylstyrenes, alpha butylstyrenes, alpha hexylstyrenes, etc.

The vinyl benzene monomer is selected from compounds having the formula

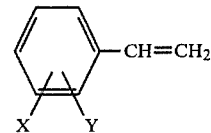

where X and Y can be the same or different and are selected from hydrogen, halogens, and alkyl radicals containing 1 to 3 carbon atoms, preferably X and Y are selected from hydrogen, chlorine, and alkyl radicals containing from 1 to 3 carbon atoms. Specific examples of vinyl benzene include styrene, 2,5-dichlorostyrene, 3,4-dichlorostyrene, vinyl toluene, butylstyrenes, ethylstyrene, propylstyrenes, vinylbenzyl chloride, etc.

The acrylate monomer is selected from compounds having the formula

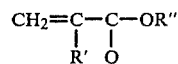

where $R'$ is selected from hydrogen, halogens, cyano radical and alkyl radicals containing 1 to 8 carbon atoms, more preferably $R'$ is selected from hydrogen, chlorine, and alkyl radicals containing 1 to 2 carbon atoms; and $R''$ is selected from hydrogen, alkyl radicals of 1 to 18 carbon atoms, and alkoxyalkyl, alkylthioalkyl and cyanoalkyl radicals containing 1 to 12 carbon atoms, preferably from 2 to 8 carbon atoms, more preferably $R''$ is selected from hydrogen, and alkyl groups containing 1 to 8 carbon atoms. Specific examples of such monomers include methyl methacrylate, ethyl methacrylate, propyl methacrylates, butyl methacrylates, methyl acrylate, ethyl acrylate, propyl acrylates, butyl acrylates, methyl ethacrylate, ethyl ethacrylate, propyl ethacrylates, butyl ethacrylates, 2-ethylhexyl methacrylate, methoxy acrylate, methyl alpha cyanoacrylate, beta cyanoethyl acrylate, hexyl thioacrylate, alpha cyanoethyl acrylate, octyl methacrylate, etc.

The aliphatic nitrile monomer is selected from compounds having the formula

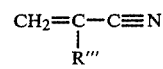

where $R'''$ is selected from hydrogen, halogens, and alkyl radicals containing 1 to 8 carbon atoms, preferably $R'''$ is selected from hydrogen, chlorine, and alkyl radicals containing 1 to 4 carbon atoms. Specific examples of suitable nitriles include acrylonitrile, methacrylonitrile, chloroacrylonitrile, ethacrylonitrile, etc.

As earlier noted, molecular weight modifiers are used in conjunction with preparation of the terpolymers in order to lower molecular weight thereof to values of DSV given herein. The dilute solution viscosity of a polymer is directly related to its molecular weight. The DSV was determined herein by an Ostwald viscometer using a 0.25% solution of the terpolymers in methyl ethyl ketone measured at 25° C. The DSV was calculated as the natural logarithm of the ratio of the flow time of the solution to the flow time of the pure solvent divided by the concentration of the polymer solution in grams per 100 ml.

Generally speaking, the molecular weight modifiers are well known. Suitable modifiers include aliphatic mercaptans and mixtures thereof, and alkylated aromatic mercaptans. More particularly, such modifiers include isohexyl, nonyl, decyl, dodecyl, hexadecyl, octadecyl, and the like, mercaptans. As the amount of the modifier charged to the reaction mixture is increased, the molecular weight and DSV of the product resin is lowered. For terpolymers described herein having DSV of less than about 2, preferably in the range of about 0.1 to 1.5, and more preferably in the range of about 0.3 to 1, amount of the modifiers required is from about 0.01 to about 5 parts per 100 parts by weight of the monomers, and preferably from about 0.1 to about 2 parts.

Processability of CPVC resins and blends thereof with terpolymers of this invention was investigated with the aid of a Brabender roll mill. The Brabender mill employed dynamometer PL-V3AA, measuring head type Roller 5 and was operated at a speed of 15 rpm at set temperature of 370° F. Sample size was 60 grams. Plastographs were then plotted and processability was evaluated on the basis of characteristics which were evident from certain configurational features of the plots of torque versus time. Maximum torque of a material should be low in order to prevent induction of stresses in the equipment. After reaching a maximum torque, there should be a rapid decline to indicate uniform melting characteristics. This latter stage should be accompanied by a moderate increase in temperature to prevent overheating and external decomposition of the material.

On the basis of these observations, the attached drawing illustrates poor processability of blend No. 10, which was a CPVC blend with a terpolymer prepared in absence of any molecular weight modifier, and CPVC resin itself, i.e., Geon 603X560 resin. The blends of CPVC with modified terpolymers all exhibited desirable characteristics of good processability.

Examples presented below illustrate preparation of the terpolymers and blends thereof with CPVC with data being provided to show effect of the terpolymers and variation in their composition on CPVC blends in terms of improved processibility and other properties. Example 1 illustrates preparation of CPVC blends with terpolymers of alpha methylstyrene, styrene and acrylonitrile in varying proportions. Amounts of the components are given in parts by weight. Example 2 sets forth blends of CPVC with terpolymers of alpha methylstyrene, methyl methacrylate and acrylonitrile in proportions indicated in parts by weight. Although no molecular weight modifiers were used in the blends of Examples 1 and 2, these blends demonstrate that the presence of the terpolymers in the CPVC blends does not adversely affects the tested properties of the blends but in fact improves some of these properties substantially. As was already described earlier, when the blends of Examples 1 and 2 were tested for processability, it was discovered that processability thereof was as poor as that of CPVC alone. It was then decided to try lower molecular weight terpolymers having dilute solution viscosity below 2. Such terpolymers were prepared by incorporating molecular weight modifiers, as demonstrated by Example 3 using terpolymers of alpha methylstyrene, styrene and acrylonitrile. The data in Table III sets forth properties of the lower molecular weight modifiers. Example 4 demonstrates preparation of CPVC blends with terpolymers of alpha methylstyrene, styrene and acrylonitrile which were prepared in Example 3. Table IV shows that properties of the CPVC blends with the terpolymers were same or better than properties of CPVC alone; furthermore, these blends processed much better than CPVC alone, as described more fully at the end of Example 4.

EXAMPLE 1

CPVC blends with terpolymers of alpha methylstyrene (AMS), styrene (St), and acrylonitrile (AN) were prepared as will now be described. The terpolymers were prepared by polymerizing the monomers in a small reaction vessel which was purged with nitrogen and then capped. More specifically, the procedure involved adding with agitation to the reaction vessel water, potassium persulfate, potassium meta bisulfite and lauryl sulfate. The water that was used was deionized and deaerated by boiling and was then stored under hydrogen. After the ingredients dissolved in water, alpha methylstyrene, styrene and acrylonitrile were added. During addition of the monomers to the reaction vessel, nitrogen was continuously bubbled through the mixture in the reaction vessel to replace air. Acidity of the mixture was at a pH of about 3.5. The reaction vessel was then sealed. For a period of about 20 hours the reaction vessel was continuously rotated in a constant temperature bath maintained at about 60° C. The reaction vessel was then opened and the polymer latex was precipitated by adding warm aluminum sulfate solution thereto. The terpolymer was separated by filtration, washed with warm methanol, twice with warm water, with methanol again, and dried in vacuo. Table I below sets forth proportion of ingredients used in parts by weight in preparing the terpolymers.

The CPVC blends with the terpolymers were prepared in a conventional manner by blending the CPVC resin with the terpolymers on a roll mill, together with a stabilizer. Table I, below, sets forth proportion of the CPVC resin to terpolymers employed, as well as properties of the resulting blends. The CPVC Geon 607X571 resin contained 67% chlorine, had inherent viscosity of 0.6, and heat distortion temperature of 106° C. measured at 264 psi. Advastab TM-180 stabilizer was butyltin mercaptide.

TABLE I

| CPVC BLENDS WITH AMS—St—AN TERPOLYMERS | | | | | |
|---|---|---|---|---|---|
| Blend No. | 1 | 2 | 3 | 4 | 5 |
| Terpolymer Composition | — | 55-30-15 | 55-20-25 | 55-15-30 | 55-10-35 |
| Geon 607X571 | 100 | 70 | 35 | 70 | 70 |
| Terpolymer | 0 | 30 | 15 | 30 | 30 |
| Advastab TM-180 Stabilizer | 2 | 1.4 | 0.7 | 1.4 | 1.4 |
| Mill Temp., °F. | 340 | 310–325 | 310 | 310 | 320–310 |

TABLE I-continued

| CPVC BLENDS WITH AMS—St—AN TERPOLYMERS | | | | | |
|---|---|---|---|---|---|
| Blend No. | 1 | 2 | 3 | 4 | 5 |
| Appearance | transparent | transp. | transp. | transp. | transp. |
| Tensile Strength, psi | 8,400 | 11,350 | 7,500 | 10,400 | 9,100 |
|  |  |  | 8,750 |  |  |
|  |  |  | 10,500 |  |  |
| Elongation, % | 8 | 9 | 6 | 8 | 6 |
| Hardness, Shore D | 92 | 90 | 91 | 92 | 90 |
| DSC, Tg, °C. | 126 | 124 | 124 | 124 | 123 |
| HDT @ 264 psi, °C. | 106 | 97 | 100 | 102 | 101 |

The above results demonstrate superiority of the CPVC blends in terms of compatibility and tensile strength when compared to CPVC alone. Tensile strength of the blends was considerably higher than that of CPVC alone except in the case of blend No. 3. As shown above, samples thereof had tensile strengths varying, for some reason, from 7,600 psi to 10,500 psi. As should be apparent, the blends set forth in Table I, above, were prepared in absence of molecular weight modifiers. For this reason, these blends processed poorly, like CPVC resin above, although no adverse affect is apparent on their other properties. The Tg and HDT of the above CPVC blends should have been higher than those for CPVC alone since Tgs of the terpolymers were higher than those for CPVC alone. All Tgs and HDTs of CPVC blends, however, were lower than those for CPVC alone, for some unexplained reason. As is evident from the above data, all terpolymers with acrylonitrile level of 15 to 35% are substantially compatible when blended with CPVC. This is indicated by the transparent character of the blend. Compatible blends yield clear products whereas incompatible blends will yield translucent products. Certain properties of incompatible blends were found to deteriorate with time.

EXAMPLE 2

Additional blends of CPVC resin with other terpolymers were prepared pursuant to the procedure set forth in Example 1. The terpolymers were prepared by polymerizing alpha methylstyrene (AMS), methyl methacrylate (MMA), and acrylonitrile (AN) in absence of molecular weight modifiers. The CPVC Geon 603X560 resin contained 67% chlorine, had inherent viscosity of 0.9 and heat distortion temperature of 103° C. measured at 264 psi. The stabilizer was butyltin mercaptide. Relative proportions of ingredients and certain test results are given in the table below.

TABLE II

| CPVC Blends With AMS—MMA—AN Terpolymers | | | |
|---|---|---|---|
| Blend No. | 6 | 7 | 8 |
| Terpolymer Composition | — | 55-30-15 | 70-15-15 |
| Geon 603X560 CPVC Resin | 100 | 70 | 70 |
| Terpolymer | 0 | 30 | 30 |
| Advastab TM-180 Stabilizer | 2 | 1.4 | 1.4 |
| Mill Temp., °F. | 340 | 320–350 | 320–340 |
| Appearance | transparent | transp. | transp. |
| Tensile Strength, psi | 8,300 | 7,700 | 10,800 |
|  |  | 9,700 |  |
|  |  | 11,700 |  |
| Elongation, % | 5 | 15 | 18 |
| Hardness, Shore D | 91 | 91 | 94 |
| DSC, Tg, °C. | 126 | 136 | 137 |
| HDT # 264 psi, °C. | 103 | 110 | 115 |

EXAMPLE 3

Several terpolymers of alpha methylstyrene (AMS), styrene (St), and acrylonitrile (AN) were prepared pursuant to procedure described in Example 1 with the exception that in this instance, the molecular weight modifiers were added, about one-half thereof initially and remainder, about one hour after polymerization commenced. Proportion of monomers and certain results are set forth in Table III, below.

TABLE III

| AMS—St—AN TERPOLYMERS | | | | |
|---|---|---|---|---|
| Sample No. | 1 | 2 | 3 | 4 |
| Water | 200 | 200 | 200 | 200 |
| Alpha Methylstyrene | 45 | 45 | 45 | 45 |
| Styrene | 25 | 25 | 25 | 25 |
| Acrylonitrile | 30 | 30 | 30 | 30 |
| Sipon WD Surfactant | 2 | 2 | 2 | 2 |
| $K_2S_2O_8$ Radical Initiator | 0.2 | 0.2 | 0.2 | 0.2 |
| $K_2S_2O_5$ Radical Initiator | 0.05 | 0.05 | 0.05 | 0.05 |
| Sulfole 90 M. Wt. Modifier | 0 | 0.2 | 0.1 | 0 |
| Sulfole 120 M. Wt. Modifier | 0 | 0 | 0.1 | 0.2 |
| Conversion, % | 97 | 99 | 99 | 97 |
| DSV in MEK | 2.80 | 0.85 | 0.87 | 0.78 |
| DSC, Tg, °C. | 132 | 128 | 128 | 127 |
| $\overline{Mn}$ | 6,500 | 3,680 | 3,050 | 3,300 |
| $\overline{Mw}$ | 33,000 | 13,200 | 14,000 | 11,100 |

Sipon WD surfactant is sodium laurylsulfate, whereas Sulfole 90 is t-nonyl mercaptan and Sulfole 120 is dodecyl mercaptan. Mn and Mw were calculated as polystyrene equivalent weight.

The above results demonstrate effect of the molecular weight of the terpolymers on certain of their properties. Sample 1 was the control without any molecular weight modifier. As is shown, Sample 1 had dilute solution viscosity (DSV) of 2.80, number average molecular weight of 6,500 and average molecular weight of 33,000. Sample 2, containing 0.2 part by weight of the molecular weight modifier, had a DSV of 0.85, an $\overline{Mn}$ of 3,680 and $\overline{Mw}$ of 13,200, which figures are much lower than for Sample 1. The other samples, containing molecular weight modifiers, also showed similar reduction in these values. It also appears that inclusion of a molecular weight modifier slightly lowers the glass transition temperature.

EXAMPLE 4

Blends of CPVC with terpolymers of 45 parts by weight alpha methylstyrene (AMS), 25 parts styrene (St), and 30 parts acrylonitrile (AN) were prepared in a conventional manner by blending CPVC with the terpolymer on a Brabender mill with a stabilizer. Table IV, below, sets forth composition of the CPVC blends and certain properties thereof.

TABLE IV
BLENDS OF CPVC AND AMS—St—AN TERPOLYMERS

| Blend No. | 9 | 10 | 11 | 12 | 13 |
|---|---|---|---|---|---|
| Terpolymer | — | Sample 1 | Sample 2 | Sample 3 | Sample 4 |
| Geon 603X560 CPVC Resin | 100 | 70 | 70 | 70 | 70 |
| Terpolymer | 0 | 30 | 30 | 30 | 30 |
| Advastab TM-180 Stabilizer | 2 | 1.4 | 1.4 | 1.4 | 1.4 |
| Mill Temp., °F. | 340 | 340-330 | 320 | 325 | 320 |
| Appearance | transparent | transp. | transp. | transp. | transp. |
| Tensile Strength, psi | 8,300 | 11,900 | 11,700 | 11,800 | 11,200 |
| Elongation, % | 5 | 11,44 | 21,54 | 17 | 7 |
| Hardness, Shore D | 91 | 90 | 90 | 90 | 90 |
| HDT @ 264 psi, °C. | 103 | 105 | 105 | 105 | 102 |

The terpolymer Samples 1 to 4 are defined in the preceding Example 3. The CPVC resin and the stabilizer are defined in the previous Example 2.

The above results indicate that the CPVC blends with lower molecular weight terpolymers have lower milling temperatures, tensile strengths which are about 3000 psi higher, and greater elongation than CPVC resin without the terpolymers. The double figures for percent elongation are values obtained on different samples of the same blends. For instance, in the case of blend No. 10, elongation for one sample was 11% and for another 44%. It should also be pointed out that blend No. 9 contained terpolymer from Sample 1 which sample was prepared in absence of a molecular weight modifier and, consequently, had a high DSV of 2.80.

Brabender plastographs were prepared to investigate processability of CPVC and 50—50 by weight blends thereof with the terpolymers. The drawing attached hereto shows plots of torque versus time for blends that were charged into the Brabender roll mill for processing. The drawing shows that CPVC blend No. 10 with a terpolymer containing no molecular weight modifier, had a maximum torque of 8300 meter-grams. Beyond this point, the torque decreased and was accompanied by generation of shear heat which raised the temperature to 430° C. in less than one minute. In contrast to this behavior, CPVC blends with the modifier showed a much lower maximum torque and generation of less shear heat which raised the temperature to only 420° F. over a prolonged period of time. As is apparent from the drawing, CPVC resin alone did not reach a high torque, however, a great deal of shear heat was produced which raised its temperature to 450° F. The CPVC resin decomposed at this temperature.

I claim:

1. Composition of matter comprising a mixture of a chlorinated polyvinyl chloride and a polymer which is present in at least a sufficient amount to improve processability of the composition without subtantially adversely affecting other properties, said polymer has a dilute solution viscosity of less than about 2, measured in methyl ethyl ketone, and is prepared by polymerizing 40 to 80 parts of alpha alkylstyrene; 2 to 50 parts of a vinyl compound selected from the group consisting of vinyl benzenes, acrylates, and mixtures thereof; and 2 to 50 parts of an aliphatic nitrile.

2. Composition of claim 1 wherein the chlorinated polyvinyl chloride resin is characterized by having a density of from about 1.53 to 1.59 grams per cc at 25° C. and a chlorine content of from about 60 to 75% by weight, heat distortion temperature within the range of 95° C. to 125° C., and high heat stability such that it is not degraded if exposed to air at 375° to 400° F. for at least 10 minutes.

3. Composition of claim 2 wherein relative proportion of components, in parts by weight, is 30 to 98 parts of the chlorinated polyvinyl chloride and 70 to 2 parts of the polymer, the alpha alkylstyrene is selected from compounds having the structural formula

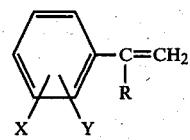

where X and Y are selected independently from hydrogen, halogens, and alkyl radicals containing 1 to 3 carbon atoms, and R is selected from alkyl radicals containing 1 to 8 carbon atoms; wherein the vinyl benzene is selected from compounds having the structural formula

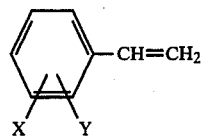

where X and Y are defined above; wherein the acrylate is selected from compounds having the structural formula

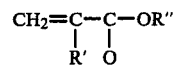

where R' is selected from hydrogen, halogens, cyano radical or alkyl radicals containing 1 to 8 carbon atoms, and R" is selected from hydrogen, alkyl radicals containing 1 to 18 carbon atoms and alkoxyalkyl, alkylthioalkyl, and cyanoalkyl radicals containing 1 to 12 carbon atoms; and wherein the aliphatic nitrile is selected from compounds having the structural formula

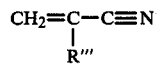

where R''' is selected from hydrogen, halogens, and alkyl radicals containing 1 to 8 carbon atoms.

4. Composition of claim 3 wherein the chlorinated polyvinyl chloride is post-chlorinated polyvinyl chloride, amount of the post-chlorinated polyvinyl chloride is 60 to 90 parts and amount of the polymer is 40 to 10 parts.

5. Composition of claim 4 wherein X and Y in the alpha alkylstyrene and vinyl benzene are independently selected from hydrogen, chlorine, and alkyl radicals of 1 to 3 carbon atoms; R in the alpha alkylstyrene is selected from alkyl radicals of 1 to 4 carbon atoms; R' in the acrylate is selected from hydrogen, chlorine and alkyl radicals of 1 to 2 carbon atoms; R'' of the acrylate is selected from hydrogen and alkyl radicals of 1 to 8 carbon atoms; and R''' of the aliphatic nitrile is selected from hydrogen, chlorine, and alkyl radicals containing 1 to 4 carbon atoms.

6. Composition of claim 5 wherein the polymer is a terpolymer which is prepared by polymerizing 45 to 75 parts of the alpha alkylstyrene, 5 to 40 parts of the vinyl compound, and 5 to 40 parts of the aliphatic nitrile, the terpolymer having a dilute solution viscosity of 0.1 to 1.5.

7. Composition of claim 6 wherein the post-chlorinated polyvinyl chloride resin is unplasticized and has a density of about 1.55 to 1.58, a chlorine content of about 65 to 72%, and a heat distortion temperature of at least 100° C.

8. Composition of claim 7 wherein the alpha alkylstyrene is selected from the group consisting of alpha methylstyrene, alpha ethylstyrene, dichloro alpha methylstyrenes, dichloro alpha ethylstyrenes, alpha ethylstyrene, alpha propyl styrenes, alpha butylstyrenes, alpha hexylstyrenes, and mixtures thereof; the vinyl benzene is selected from the group consisting of styrene; dichlorostyrenes, vinyl toluene, butylstyrenes, ethylstyrene, propylstyrenes, vinylbenzyl chloride, and mixtures thereof; the acrylates are selected from the group consisting of methyl methacrylate, methyl acrylate, methyl ethacrylate, ethyl methacrylate, ethylhexyl methacrylate, propyl acrylates, butyl acrylates, ethyl ethacrylate, propyl ethacrylates, butyl ethacrylates, and mixtures thereof; and the aliphatic nitrile is selected from the group consisting of acrylonitrile, methacrylonitrile, chloroacrylonitrile, ethacrylonitrile, and mixtures thereof.

9. Composition of claim 8 wherein the terpolymer has a dilute solution viscosity of about 0.3 to 1.

10. Composition of claim 9 wherein the alpha alkylstyrene is alpha methylstyrene, the vinyl benzene is styrene, the acrylate is methyl methacrylate, and the aliphatic nitrile is acrylonitrile.

* * * * *

UNITED STATES PATENT AND TRADEMARK OFFICE
CERTIFICATE OF CORRECTION

PATENT NO. : 4,304,884
DATED : December 8, 1981
INVENTOR(S) : Yoshihisa Okamoto

It is certified that error appears in the above—identified patent and that said Letters Patent are hereby corrected as shown below:

Col. 4, line 30, the formula should read as follows:

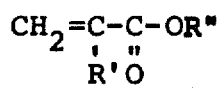

Col. 10, line 45, the formula should read as follows:

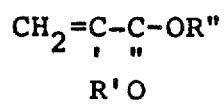

On the title page, Abstract, line 4, delete "5"..

Signed and Sealed this

Tenth Day of May 1983

[SEAL]

Attest:

GERALD J. MOSSINGHOFF

Attesting Officer — Commissioner of Patents and Trademarks